United States Patent [19]
Orii

[11] Patent Number: 5,200,863
[45] Date of Patent: Apr. 6, 1993

[54] IMAGE DATA RECORDING SYSTEM INCLUDING MEMORY CARD

[75] Inventor: Masaharu Orii, Oome, Japan

[73] Assignee: Casio Computer Co., Ltd., Tokyo, Japan

[21] Appl. No.: 835,105

[22] Filed: Feb. 12, 1992

Related U.S. Application Data

[63] Continuation of Ser. No. 503,113, Mar. 28, 1990, abandoned, which is a continuation of Ser. No. 185,491, Apr. 25, 1988, abandoned.

[30] Foreign Application Priority Data

Apr. 30, 1987 [JP] Japan .................................. 62-107651

[51] Int. Cl.$^5$ .............................................. H04N 5/78
[52] U.S. Cl. .................................. 360/35.1; 360/33.1
[58] Field of Search ........................... 360/35.1, 33.1; 358/310, 335, 906, 909

[56] References Cited

U.S. PATENT DOCUMENTS

| | | | |
|---|---|---|---|
| 4,131,919 | 12/1978 | Lloyd . | |
| 4,366,501 | 12/1982 | Tsunekawa et al. . | |
| 4,420,773 | 12/1983 | Toyoda et al. . | |
| 4,489,351 | 12/1984 | d'Alayer de Costemore d'Arc . | |
| 4,647,976 | 3/1987 | Nakagaki et al. | 358/909 X |
| 4,652,926 | 3/1987 | Withers et al. | 358/909 X |
| 4,691,253 | 9/1987 | Silver | 358/906 X |
| 4,758,883 | 7/1988 | Kawahara et al. | 360/10.1 X |
| 4,783,707 | 11/1988 | Nemoto et al. | 358/906 X |
| 4,897,732 | 1/1990 | Konishita et al. | 358/906 |
| 4,974,111 | 11/1990 | Platte et al. | 360/35.1 |

FOREIGN PATENT DOCUMENTS

| | | | |
|---|---|---|---|
| 59-183582 | 10/1984 | Japan | 358/909 |
| 2089169 | 6/1982 | United Kingdom | 358/909 |

OTHER PUBLICATIONS

Toshiba Owner's Manual Beta hi-fi J-S36 Audio Cassette Recording Date-1983 pp. 9-10 and 22.

*Primary Examiner*—Andrew L. Sniezek
*Assistant Examiner*—Varsha J. Sheladia
*Attorney, Agent, or Firm*—Frishauf, Holtz, Goodman & Woodward

[57] ABSTRACT

An electronic video data recording system includes a camera apparatus for photoelectric-converting an incident optical image into electronic image data; a memory card detachably mounted on the camera apparatus and containing a random access memory to store the electronic image data; and a video tape recorder or other outside storage device for recording the image data which have been previously stored in the random access memory of the detachable memory card, the image data being supplied from the memory card through the camera apparatus. When taking the image, the detachable memory card is mounted on the camera apparatus so as to store the image data into the random access memory thereof. When the image data stored in the detachable memory card are recorded, they are transferred from the memory card into the video tape recorder, via the camera apparatus. The detachable memory card can then be re-used.

47 Claims, 9 Drawing Sheets

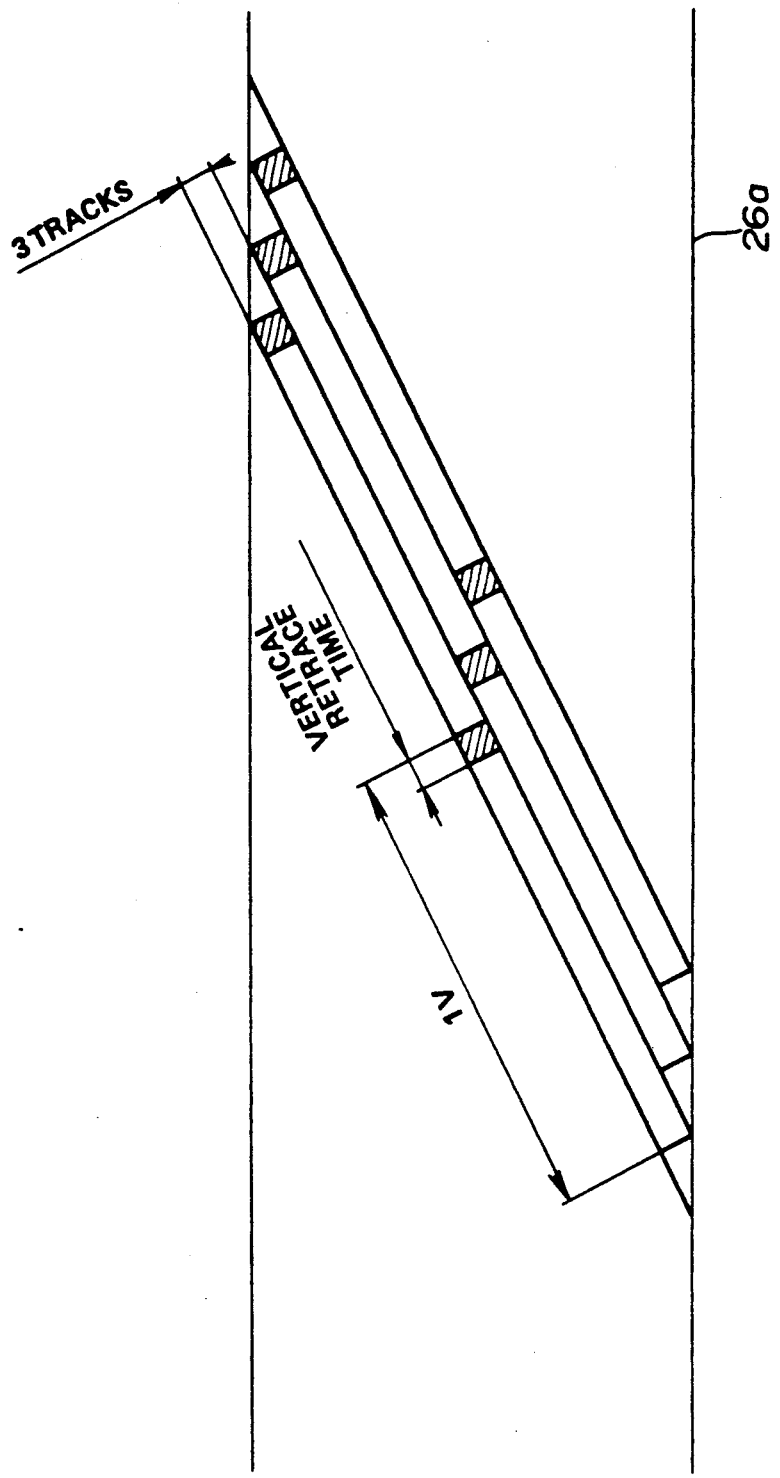

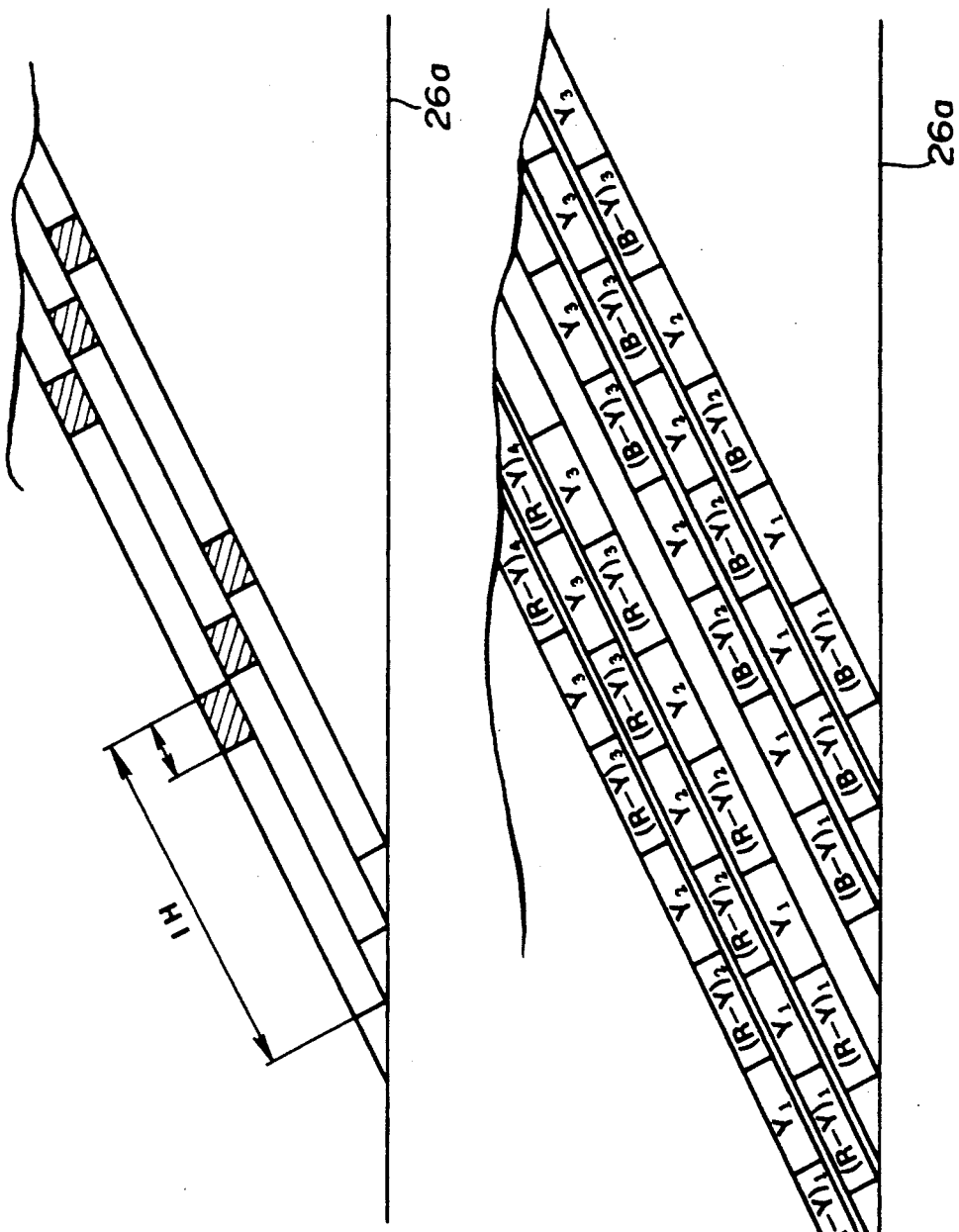

IMAGE DATA RECORDING SYSTEM INCLUDING MEMORY CARD

This application is a continuation of application Ser. No. 07/503,113 now abandoned, filed Mar. 28, 1990, which is a continuation of Ser. No. 07/185,491 now abandoned filed Apr. 25, 1988 (now abandoned).

BACKGROUND OF THE INVENTION

Field of the Invention

The present invention generally relates to an image data recording system for receiving an optical image incident upon an image recording system through a lens, for converting the received optical image into electronic image data, and for storing the electronic image data therein. More specifically, the present invention is directed to an image data recording system utilizing memory cards to store the electronic image data.

Description of the Related Art

As an image data recording system, a so-called "electronic still camera" has been practically marketed. In the commercially available electronic still cameras, still images are optically and electrically processed to be stored in a recording medium, for instance, a magnetic disk.

More specifically, in the conventional electronic still camera, a semiconductor imaging element, e.g., a charge-coupled device (referred to as a "CCD") is employed to optically receive a still image and convert it into a corresponding electronic image signal. After the electronic image signal is processed to have a signal format suitable for a television signal, the processed image signal is modulated into an FM (frequency modulation) image signal. Then, the FM image signal is recorded onto a magnetic disk in an analog signal form. If such an electronic still camera records the FM image signals with a field recording format, 50 still pictures or complete images can be recorded on a magnetic disk.

In such a conventional magnetic disk type electronic still camera, miniaturization of the electronic still camera meets with practical difficulties, because there is a size limitation to manufacture of a compact driving mechanism for driving the magnetic disk.

Accordingly, to solve these difficulties of the conventional magnetic disk type electronic still camera, another type of electronic still camera employing a built-in semiconductor memory (referred to as a "RAM") has been recently developed, in which an analog still image signal is processed to obtain a digital still image signal. The digital still image signal, or digital image data is stored in the built-in semiconductor memory (RAM).

However, the semiconductor memory type electronic still camera has another drawback. In general, when a single still image is stored into a semiconductor memory, a memory capacity of more than 2 M bits (mega bits) is required for each still image. Therefore, to store 50 still pictures (or images) in such a semiconductor memory type still camera, which is similarly performed in the magnetic disk type still camera, a semiconductor memory having a memory capacity of more than 100 M bits is required. However, a semiconductor memory type still camera having such an extremely high memory capacity is not practically available.

SUMMARY OF THE INVENTION

The present invention has been accomplished in an attempt to solve the problems mentioned above. An object of the invention is therefore to provide a still image recording system wherein a compact camera body can be realized and a relatively large quantity of still images can be temporarily or permanently stored in a detachable memory unit.

To achieve the above-described object of the invention, an image data recording system of the present invention comprises: a housing means; optical means arranged at least partly in the housing means, for forming an optical image on a predetermined plane in the housing means; image data processing means arranged in the housing means for producing digital electronic image data in response to the optical image; memory means detachably mounted to the housing means and electrically coupled to the image data processing means when mounted to the housing means, for storing the digital electronic image data therein; output terminal means arranged in the housing means and being coupled for outputting the digital electronic image data derived from the detachable memory means when the detachable memory means is mounted to the housing means; and control means arranged in the housing means, for controlling a writing operation of the digital electronic image data into the detachable memory means when the detachable memory means is mounted to the housing means, and for controlling a reading out operation of the digital electronic image data to the output terminal means from the detachable memory means when the detachable memory means is mounted to the housing means.

According to a further feature of the invention, a peripheral memory means, arranged outside of the housing means, is detachably coupled to the output terminal means, for storing the digital electronic image data therein which was read out from the detachable memory means and which was output from the output terminal means.

A display means is preferably coupled to at least one of the output terminal means and the peripheral memory means, for displaying an image representative of the digital electronic image data which was stored in the detachable memory means.

After the digital electronic image data is read out from the detachable memory means and stored in the peripheral memory means (such as a video tape recorder), the detachable memory means can be re-used or erased and stored for late re-use.

The detachable memory means may be memory cards each containing at least one semiconductor memory chip, or other detachable memory card-like devices.

With the above-described arrangements of the still image recording systems according to the present invention, a compact and portable electronic still camera can be obtained, since a disc drive mechanism is not needed. In addition, the effective memory capacity of the system using detachable semiconductor memory units is equal to, or higher than, that of the conventional electronic still camera using RAM memory in the conventional manner or using the conventional disc drive arrangement.

BRIEF DESCRIPTION OF THE DRAWINGS

FIGS. 8 to 10 show recording formats of the video tape recorder illustrated in FIG. 4.

DETAILED DESCRIPTION OF THE PREFERRED EMBODIMENTS

OVERALL ELECTRONIC STILL CAMERA SYSTEM

Figure 1:
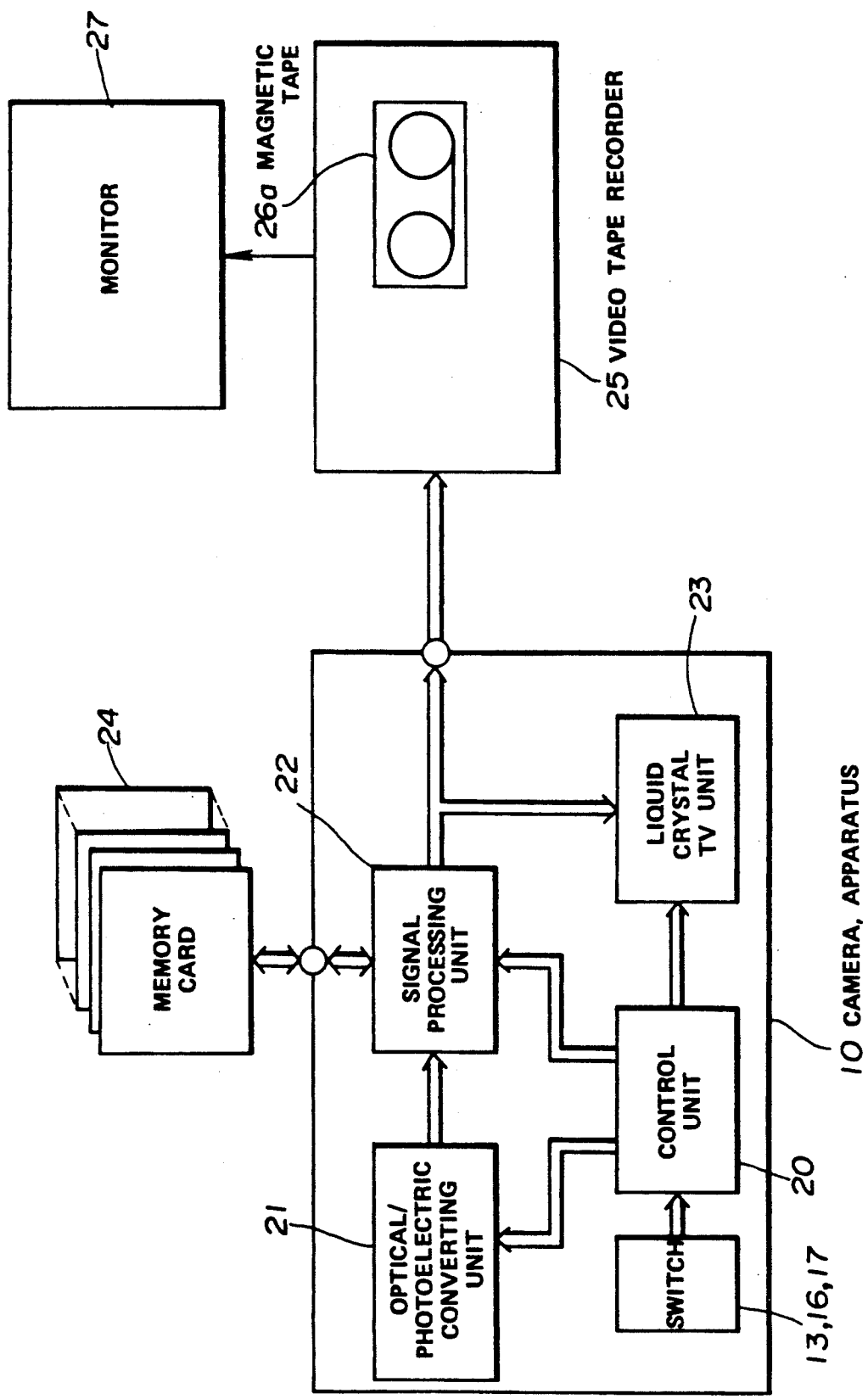
FIG. 1 schematically shows a block diagram of an electronic still camera system according to the invention.

In FIG. 1, there is shown an electronic still camera system utilizing an image data recording system according to the invention. The electronic still camera system includes a camera apparatus 10 which is shown in FIG. 2.

The camera apparatus 10 includes a housing 11. An optical unit 12 having lenses, a diaphragm and other optical components (not shown in detail), is mounted to a front surface portion of the housing 11. A release or shutter switch 13 is provided, for example on an upper surface of the housing 11, and an insertion opening 14 for a memory card 24 is formed for example on an upper surface of the housing 11. The memory card 24 is a detachable memory card containing an image data storage memory, and will be discussed hereinafter. On a rear surface of the housing 11, there are provided a view finder 15, an operation mode selecting switch 16, an output mode selecting switch 17 and a liquid crystal display panel 18. The output mode selecting switch 17 functions to selectively feed the output signal to a video tape recorder 25, or a monitor 27, in analog signal form, or in digital signal form when the image data stored in the memory card 24 is transferred to the video tape recorder 25, or to the monitor 27.

Figure 2:
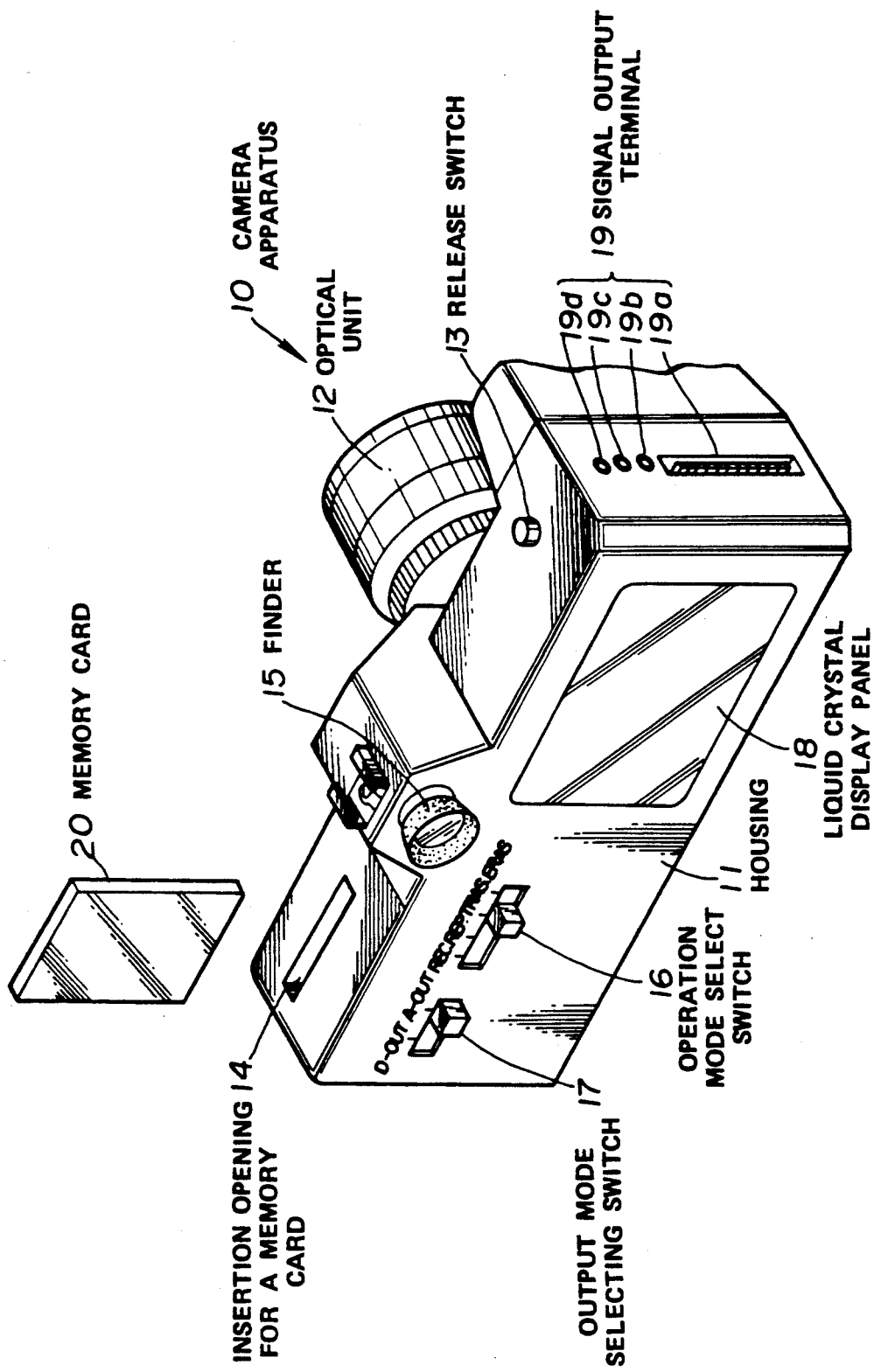
FIG. 2 is a perspective view of a still camera apparatus employing the electronic still camera system shown in FIG. 1.

A signal output terminal 19 is provided on one side surface of the housing 11, for example the right side as viewed in FIG. 2. This signal output terminal 19 comprises a digital image output terminal 19a, an analog image output terminal 19b, a synchronizing (referred to as a "sync") signal output terminal 19c, and a recorder control signal terminal 19d.

SIGNAL PROCESSING SYSTEM IN CAMERA APPARATUS

Referring now to FIG. 1, an internal signal processing system of the electronic still camera apparatus 10 will be described in detail.

A control unit 20 is provided for controlling the overall operation of the electronic still camera apparatus 10 in response to switching operations of the various switches 13, 16 and 17. An optical/photoelectric converting unit 21 is connected to the control unit 20. The optical/photoelectric converting unit 21 converts an optical image incident upon converting unit 21 through the optical unit 12 into an electrical signal and outputs the electrical signal as an electrical image signal. A signal processing unit 22 is connected to the optical/photoelectric converting unit 21 and also to the control unit 20 so as to perform a predetermined signal processing operation on the electrical image signal input from the optical/photoelectric converting unit 21. The signal processing unit 22 transfers the processed electrical image signal to the memory card 24 which is detachably connected to the camera apparatus 10, and transfers a television video signal to a liquid crystal television unit 23 after the image data (i.e., the processed image signal) is converted into a television video signal, and furthermore, transfers either the above-described television video signal or a digital image signal to the video tape recorder 25. The liquid crystal television unit 23 is connected to the signal processing unit 22 and to the control unit 20 in order to display on the liquid crystal display panel 18 an image representative of the television video signal sent from the signal processing unit 22. The displayed image corresponds to the optical image received by the converting unit 21.

The memory card 24, is detachably inserted into the insertion opening 14 for the memory card formed on the camera apparatus 10 such that the inserted memory card 24 is electrically connected to the above-described signal processing unit 22. The memory card 24 comprises a random access memory (RAM) having a memory capacity of 32 M bits (mega bits) by means which four (4) still pictures imaged with the frame recording format by the camera apparatus 10 can be stored.

The above-described video tape recorder 25, when connected to the output terminal 19, magnetically records the image signals derived from the memory card 24 of the camera apparatus 10 on a magnetic cassette tape 26 for permanent or long term or short term storage of the image signals corresponding to the images.

A monitor 27 is connected to the video tape recorder 25 to display an image in response to a television video signal output from the video tape recorder 25.

CIRCUIT ARRANGEMENT OF CAMERA APPARATUS

Figure 3:
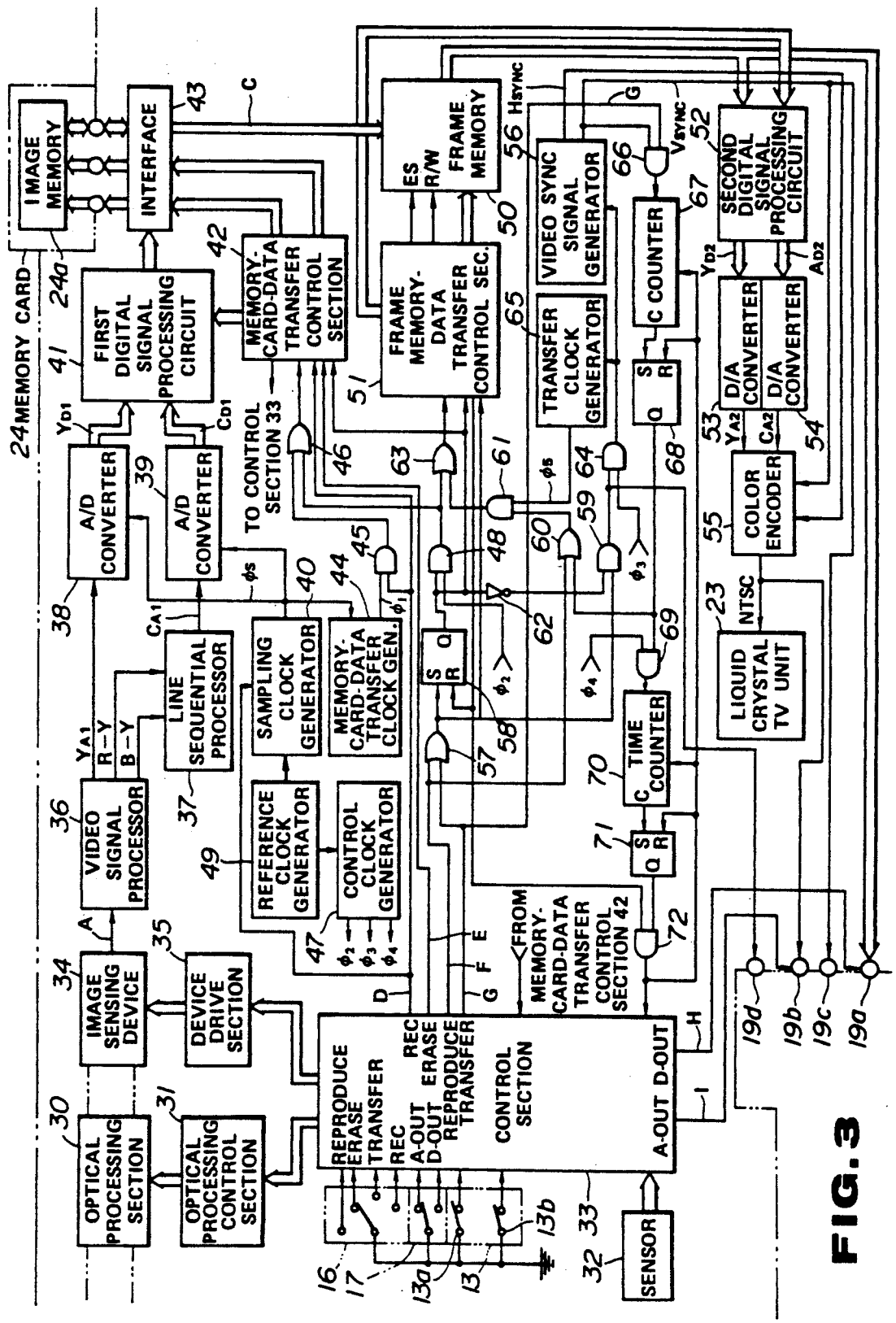
FIG. 3 is a schematic block diagram of a circuit arrangement of the camera apparatus shown in FIG. 2.

Referring now to FIG. 3, a detailed circuit arrangement of the camera apparatus 10 will be described.

An optical processing section 30 includes lenses, a shutter and a lens driving mechanism (not shown in detail). In response to a control signal from an optical processing control section 31, the optical processing section 30 moves the lenses, and actuates the diaphragm and shutter. The optical processing control section 31 operates as follows. Focus detecting information, diaphragm-opening-angle information, and shutter-opening time information are supplied to the optical processing control section 31 from a control section 33 based upon a sensor output of a sensor 32 for optically sensing an optical image incident upon the optical processing section 30 in response to an output of a switch 13a which is closed by depressing the release (or shutter) switch over half of its travel path. In accordance with the above-described various information, the optical processing control section 31 outputs control signals to the optical processing section 30.

The optical image coming through the optical processing section 30 is focused on an image sensing device 34. The image sensing device 34 may be any of solid-state imaging elements fabricated by, for example, a CCD (charge-coupled device) image sensor or a MOS (metal-oxide-semiconductor) image sensor. Solid state image sensing device 34 comprises photoelectric converting elements (not shown) which are arranged in a two dimensional arrangement together with color filters (not shown) having predetermined patterns. Image sensing device 34 is driven by a device drive section 35 in response to a control signal issued by the control section 33.

An output signal "A" derived from the imaging device 34 is supplied to a video signal processor 36 which functions as a color separating circuit. The video signal processor or color separating circuit 36 produces a luminance signal (monochrome signal) "Y" corresponding to each pixel and each of color signals (R, G, B) based upon the photoelectric converting signal which is produced by the light information output from the image sensing device 34 via respective color filters, and also produces color difference signals (R−Y) and (B−Y) from the luminance signal "Y" and the color signals (R,G,B).

The color difference signals (R−Y), (B−Y) derived from the color separating circuit 36 are supplied to a line sequential processor 37. The line sequential processor 37 alternately selects the color difference signals (R−Y), (B−Y) supplied from the color separating circuit 36 every one pixel, and sequentially outputs the selected color difference signal. Both the luminance signal "$Y_{A1}$" derived from the color separating circuit 36 and the color difference signal "$C_{A1}$" output from the line sequential processor 37 are supplied to corresponding A/D (analog-to-digital) converters 38 and 39. A/D converters 38 and 39 convert the luminance signal YA1 and color difference signal CA1 into 8-bit digital data "$Y_{D1}$" and "$C_{D1}$" based upon a sampling clock $\phi_S$, for example of 13.5 MHz, output from a sampling clock generator 40.

Digital data $Y_{D1}$, $C_{D1}$ output from the A/D converters 38, 39, respectively, are supplied to a first digital signal processing circuit 41.

Under control of a memory-card-data transfer controlling section 42, the first digital signal processing circuit 41 performs a predetermined signal processing (e.g., control of the output timing, or adding the parity check code) required for storing the digital data $Y_{D1}$, $C_{D1}$ output from the respective A/D converters 38, 39 into an image memory 24a in the memory card 24. Processing circuit 41 also supplies the digital data $Y_{D1}$, $C_{D1}$ to the interface 43 in a predetermined order.

The memory-card-data transfer control section 42 performs its data transfer in synchronism with a signal produced based upon the control signal output from the control section 33, a clock $\phi_1$ input from the memory-card-data transfer clock generator 44 via AND gate 45 and OR gate 46, and a clock $\phi_2$ input from a control clock generator 47 via OR gate 46.

Then, the memory-card-data transfer control section 42 performs various control operations via the interface 43 to the image memory 24a and the addressing operation, and outputs a transfer completion signal to the control section 33 when the data transfer to the image memory 24a of memory card 24 is accomplished.

It should be noted that a clock $\phi_B$ derived from the reference clock generator 49 is supplied to the sampling clock generator 40, and control clock generator 47.

Also, the sampling clock $\phi_S$ is supplied to memory-card-data transfer clock generator 44, from the sampling clock generator 40. The sampling clock $\phi_S$ and the transfer clock $\phi_1$ establish substantially the synchronism condition of the memory-card-data transfer clock generator 44.

A data output bus "C" of the interface 43 is connected to the frame memory 50. The frame memory 50 has a memory capacity sufficient for storing the digital data corresponding to one frame of image data. Frame memory 50 is addressed under the address control of a frame-memory-data transfer control section 51, and is furthermore read/write-controlled, and chip-enable -controlled, by control section 51. The digital data output from the frame memory 50 is supplied to a digital signal processing circuit 52 and to a digital image signal output terminal 19a.

The functions of the digital signal processing circuit 52 are to separate the digital data output from the frame memory 50 into luminance data $Y_{D2}$ and color difference data $C_{D2}$, and to output both the luminance data $Y_{D2}$ and color difference data $C_{D2}$ to D/A (digital-to-analog) converters 53 and 54 at a predetermined controlled timing. The overall operation of the digital signal processing circuit 52 is under control of the frame-memory-data transfer control section 51. When parity check data is added to the digital data derived from the A/D converters 38, 39 in the first digital signal processing circuit 41, the parity check operation will be executed in the second digital signal processing circuit 52.

The luminance data $Y_{D2}$ and color difference data $C_{D2}$ are converted into corresponding analog signals $Y_{A2}$ and $C_{A2}$ by the D/A converters 53 and 54, and thereafter these analog signals $Y_{A2}$ and $C_{A2}$ are output to the color encoder 55.

Color encoder 55 produces a NTSC (National Television Systems Committee) color television signal based upon a horizontal sync (synchronizing) signal $H_{sync}$ and a vertical sync signal $V_{sync}$ supplied from a video sync signal generator 56, and the above-described analog luminance signal $Y_{A2}$ and analog color difference signal CA2, and then, outputs this NTSC color television signal to a liquid crystal television unit 23 and an analog image signal output terminal 19b, respectively.

CONTROL OPERATIONS OF CONTROL SECTION

As previously described, the control section 33 outputs the various control signals in accordance with the various conditions of the above-mentioned release switch 13, operation mode selecting switch 16 and output mode selecting switch 17.

First, a recording command signal "D" output from the control section 33 is supplied as an enable signal to the sampling clock generator 40, and also to the memory-card-data transfer control section 42 and to the AND gate 45. AND gate 45 outputs the transfer clock $\phi_1$ derived from the memory-card-data transfer clock generator 44 via an OR gate 46 to the memory-card-data transfer control section 42 based upon the output of the recording command signal D. The memory-card-data transfer control section 42 controls the first digital signal processing circuit 41 in response to the outputs of the recording command signal D and transfer clock $\phi_1$, and write-controls the digital data output from the first digital data signal processing circuit 41 into the image memory 24a of the memory card 24.

An erasing command signal "E" output from the control section 33 is supplied to the memory-card-data transfer control section 42 so as to erase the digital data stored in the image memory 24a under the control of the memory-card-data transfer control section 42. A reproducing command signal "F" derived from the control section 33 is supplied (i) via an OR gate 57 to a flip-flop 58, the frame-memory-data transfer control section 51, and an AND gate 59; and (ii) via an OR gate 60 to an AND gate 61.

The flip-flop 58 is reset in response to a final address signal supplied from the frame-memory-data transfer control section 51 designating the final address of the frame memory 51. Flip-flop 58 transfers its set output "Q" to the frame-memory-data transfer control section 51, memory-card-data transfer control section 42, and to the AND gate 48, and also via an inverter 62 to the AND gate 59. The AND gate 48 sends via the OR gate 46 the control clock $\phi_2$ derived from the control clock generator 47 to the memory-card-data control section 42, and via an OR gate 63 to the frame-memory-data transfer control section 51 based upon the signal conditions given from the set output "Q" of the flip-flop 58. Both the memory-card-data transfer control section 42 and the frame memory-data transfer control section 51 control the data transfer from the image memory 24a to the frame memory 50 based upon the output signal of the OR gate 57, the set output Q of the flip-flop 58, and the control clock $\phi_1$. The AND gate 59 supplies its gate output to the recorder control signal output terminal 19d and an AND gate 64 based upon the output signal of the OR gate 57 and the set output Q of the flip-flop 58 supplied via the inverter 62 thereto. The AND gate 64 transfers the control clock $\phi_3$ output from the control clock generator 47 to a transfer clock generator 65 and the video sync signal generator 56, respectively, in response to the output of the AND gate 59. Transfer clock generator 65 derives a transfer clock $\phi_5$ based upon the clock $\phi_3$, and supplies this transfer clock $\phi_5$ to the AND gate 61.

The AND gate 61 furnishes the transfer clock $\phi_5$ via the OR gate 63 to the frame-memory-data transfer control section 51 based upon the output of the OR gate 60. The function of the frame-memory-data transfer control section 51 is to transfer the image data previously stored in the frame memory 50 to the second digital signal processing circuit 52 based upon the outputs from the flip-flop 58 and the transfer clock $\phi_5$.

The video sync signal generator 56 produces the horizontal sync signal $H_{sync}$ and vertical sync signal $V_{sync}$ according to the NTSC television system in response to the control clock $\phi_3$. The horizontal sync signal $H_{sync}$ is supplied to the color encoder 55. The vertical sync signal $V_{sync}$ is similarly supplied to the color encoder 55, and to the sync signal output terminal 19c and to AND gate 66. The transfer command signal "G" output from the control section 33 is supplied to the other input terminal of the AND gate 66, the output of which is supplied to a counter 67.

The counter 67 counts the vertical sync signal $V_{sync}$ which is supplied via the AND gate 66 thereto, and supplies a carry output "C" to the flip-flop 68 when the counting value of the counter 67 becomes a predetermined number. In other words, a predetermined number (for example, 10) of the vertical sync signal $V_{sync}$ is input into the counter 67.

The flip-flop 68 supplies its set output "Q" via the OR gate 60 to the AND gate 61 and also to the AND gate 69. The AND gate 69 supplies a control clock $\phi_4$ derived from the control clock generator 47 to a time counter 70 in response to the set output Q of the flip-flop 68. The time counter 70 counts the time based upon the control clock $\phi_4$, and furnishes the carry output to a set terminal "S" of the flip-flop 71 when a predetermined time, e.g., 10 seconds has elapsed. The flip-flop 71 supplies its set output Q to an AND gate 72.

The AND gate 72 receives the final address signal derived from the frame-memory-data transfer control section 51 at its other input terminal, when transfer section 51 designates the final address of the frame memory 50. Then, the AND gate 72 supplies its output to the control section 33 as a transfer completion signal, and also to the reset terminals of the counter 67, flip-flops 68, 71 and time counter 70.

The transfer command signal "G" output from the control section 33 is supplied via the AND gate 66 and OR gate 57 to the flip-flop 58 and frame-memory data transfer control section 51.

The control section 33 also supplies terminal control signals "H" and "I" to the digital image signal output terminal 19a and to the analog image signal output terminal 19b respectively in accordance with the switch conditions of the output mode selecting switch 17.

CIRCUIT ARRANGEMENT OF VIDEO TAPE RECORDER

Figure 4:
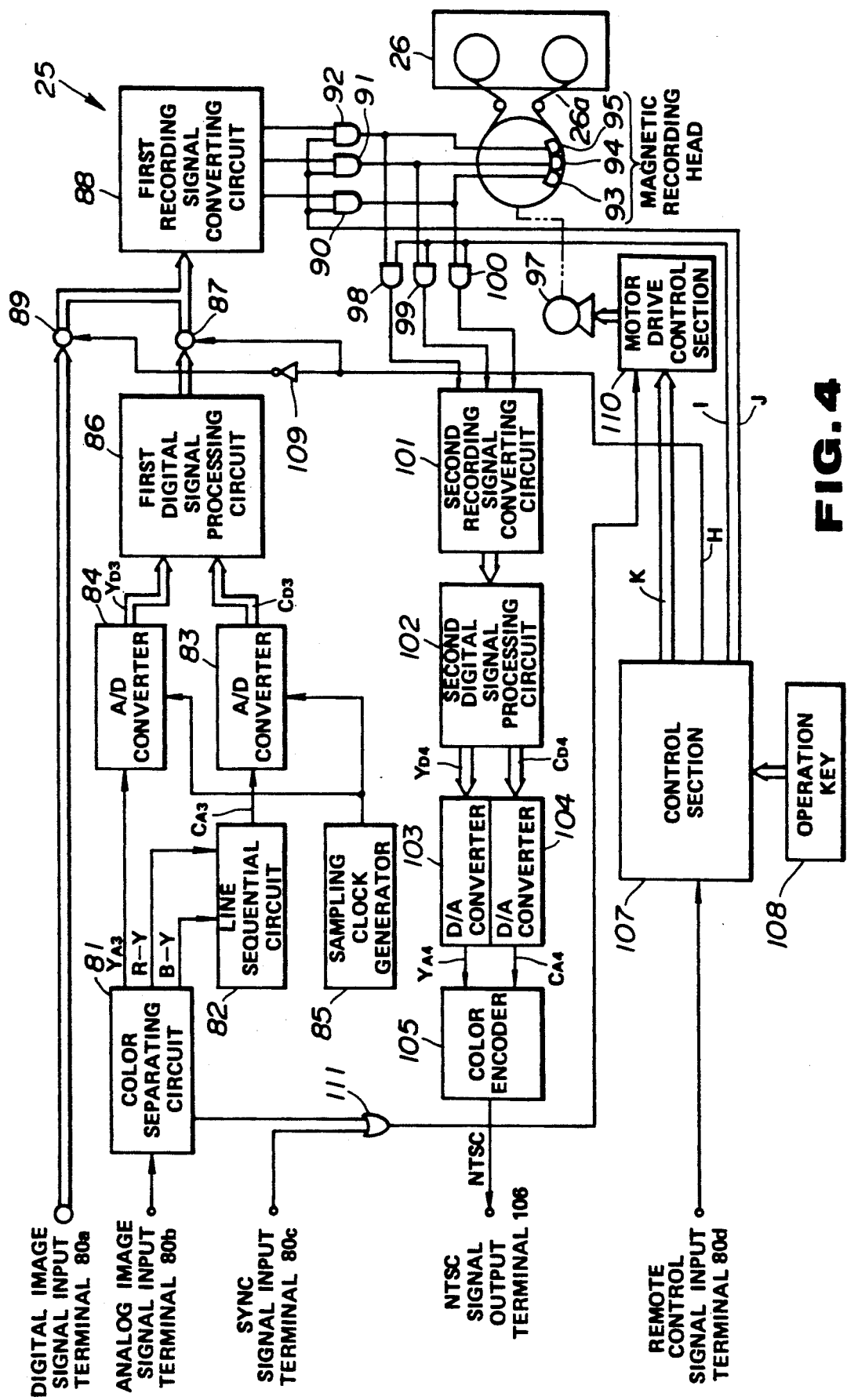
FIG. 4 is a schematic block diagram of a circuit arrangement of the video tape recorder shown in FIG. 1.

Referring now to FIG. 4, a circuit arrangement of the video tape recorder 25 will be described.

For the sake of simplicity, only the circuit arrangement of the image signal processing system will be described and the remaining circuit arrangement will not be described.

The video tape recorder 25 includes a digital image signal input terminal 80a, an analog image signal input terminal 80b, a sync signal input terminal 80c and a remote control signal input terminal 80d.

The analog image signal input terminal 80b is connected to a color separating circuit 81. The function of the color separating circuit 81 is to separate a luminance signal YA3, color difference signals (R−Y) and (B−Y), and a vertical sync signal $V_{sync}$ from the NTSC signal input from the analog image signal input terminal 80b. These color difference signals (R−Y) and (B−Y) are supplied to the line sequential circuit 82.

The line sequential circuit 82 alternately selects the color difference signals (R−Y), (B−Y) derived from the color separating circuit 81 and sequentially outputs the selected color difference signal to an A/D converter 83.

The luminance signal YA3 is, on the other hand, directly input into an A/D converter 84, which is output from the color separating circuit 81. The A/D converters 83 and 84 convert the luminance signal YA3 and color difference signal CA3 into 8-bit digital data $Y_{D3}$, $C_{D3}$, respectively, in synchronism a sampling clock $\phi_S$ output from a sampling clock generator 85. A/D converters 83, 84 output the digital data $Y_{D3}$, $C_3$ into a first digital signal processing circuit 86.

The first digital signal processing circuit 86 performs a predetermined digital processing (for instance, the parity code being added) on the digital data $Y_{D3}$, $C_3$ supplied from the A/D converters 83, 84, and thereafter outputs the luminance data $Y_{D3}$ and color difference data $C_{P3}$ to a first recording signal converting circuit 88 via a gate circuit 87 in a predetermined order. 8-bit digital image data from the digital-image-signal input terminal 80a is supplied to the first recording signal converting circuit 88 via the gate circuit 89.

In the first recording signal converting circuit 88, the 8-bit digital data input thereto is separated into the upper 3-bit data, medium 3-bit data and lower 2-bit data, and thereafter, these pieces of separated digital data are modulated on the respective magnetic recording signals to output serial digital data. The magnetic recording signals output from the first recording signal converting circuit 88 are supplied via corresponding AND gates 90, 91 and 92 to respective magnetic recording heads 93, 94 and 95. That is, the upper 3-bit data is supplied to the magnetic recording head 93, the medium 3-bit data is supplied to the magnetic recording head 94, and the lower 2-bit data is supplied to the magnetic recording head 95 in serial data form.

The magnetic recording heads 93, 94, 95 are mounted on a rotary cylinder 96. The rotary cylinder 96 is rotated by a motor 97. A magnetic tape 26a of a magnetic cassette tape 26 is wound on the rotary cylinder 96. With the above-described construction, the magnetic recording heads 93 to 95 perform a helical scanning with respect to the magnetic tape 26a and accordingly, the digital data are sequentially recorded on three tracks of the magnetic tape 26a in a single scanning.

The magnetic recording heads 93 to 95 furnish a readout signal from the magnetic tape 26a to a second recording signal converting circuit 101 via AND gates 98 to 100.

After the second recording signal converting circuit 101 demodulates the signals supplied from the magnetic recording heads 93 to 95, the demodulated signals are synthesized to obtain 8-bit digital data which is then sent to a second digital signal processing circuit 102.

The second digital signal processing circuit 102 performs a parity check on the 8-bit digital data derived from the second recording signal converting circuit 101, and separates the input 8-bit digital data into the luminance data YD4 and color difference data $C_{D4}$, and then outputs them to the D/A converters 103 and 104. A luminance signal $Y_{D4}$ and a color difference signal $C_{A4}$ which are converted by the D/A converters 103, 104, are supplied to a color encoder 105 outputs the NTSC color television signal to the NTSC signal output terminal 106.

As shown in FIG. 4, a control section 107 is employed in the video tape recorder. The control section 107 produces various control signals in response to an operation key 108 which is manually operated by a user, and in response to the remote control signal sent from the remote control signal input terminal 80d. First, a gate control signal H derived from the control section 107 is supplied directly to the gate circuit 87, and is supplied via inverter 109 to the gate circuit 89 so as to control gate circuits 87, 89. Secondly, a recording command signal "I"produced in the control section 107 is supplied to the AND gates 90 to 92 to control the supply of the output signals of the first recording signal converting circuit 88 to the corresponding magnetic recording heads 93 to 95. Also, a reproducing command signal "J" sent from the control section 107 is supplied to the AND gates 98 to 100 to control the supply of the signals read out by these magnetic recording heads 93 to 95 to the second recording signal converting circuit 101. A motor control signal "K" from the control section 107 is supplied to a motor drive control section 110 for controlling the rotation of the motor 97.

Upon receipt of the motor control signal "K" and also the vertical sync signal $V_{sync}$ supplied via an OR gate 111 from the color separating circuit 81 and sync signal input terminal 80c, the control section 107 controls the motor 97.

OVERALL OPERATION OF ELECTRONIC STILL CAMERA SYSTEM

Overall operation of the electronic still camera system will now be described in detail.

RECORDING IMAGE DATA IN MEMORY CARD

When a user wishes to take a picture, or image of an object and record it on the memory card 24 as the image data, the user first sets the operation mode selecting switch 16 to the "recording mode" in the camera apparatus 10 shown in FIG. 2. Then, the camera apparatus 10 is directed toward the object, and the release switch 13 is depressed about half way, so that the switch 13a is closed as illustrated in FIG. 3.

When the switch 13a is closed, the output signals from the sensor 32 are read out, and the focus sensing information, diaphragm open-angle information and shutter open-time information are calculated, and the resultant data are supplied to the optical processing control section 31 under the control of the control section 33.

The optical processing control section 31 controls the lens position, diaphragm open-angle and so on of the optical processing section 30 based on the various information supplied from the control section 33. Thereafter, when the user fully depresses the release switch 13 over its full travel path, the switch 13b is closed ard the recording command signal "D" from the control section 33 is supplied to the sampling clock generator 40, to AND gate 45, and to memory-card-data transfer control section 42, respectively. Similarly, the shutter operation command is supplied to the optical processing control section 31. As a consequence, the shutter (not shown in detail) of the optical processing section 30 is actuated under control of the optical processing control section 31 so that the object image is focused onto the image sensing device 34. Moreover, the control section 33 outputs an operation command to the device drive section 35, and the electronic image signal which is produced in the image sensing device 34 by photoelectric-converting of the object's image, is supplied to the color separating circuit 36 in such a manner that the photoelectric-converted image data is sequentially supplied thereto one pixel of the image data at a time (i.e., pixel - by - pixel).

In the color separating circuit 36, the luminance signal $Y_{A1}$, and color difference signals (R−Y), (B−Y) are produced from the electronic image signal derived from the image sensing device 34, and the luminance signal $Y_{A1}$ is output to the A/D converter 38. The color difference signals (R−Y), (B−Y) are output to the line sequential processor 37.

On the other hand, in the line sequential processor 37, the 5 color difference signals (R−Y), (B−Y) are alternately selected for every one pixel and the selected color difference signals are sequentially supplied to the A/D converter 39.

From the A/D converters 38 and 39, the 8-bit luminance data $Y_{D1}$ and the 8-bit color difference data $C_{D1}$ are output responsive to the luminance signal $Y_{A1}$ and color difference signal $C_{A1}$, respectively, in synchronism with the sampling clock $\phi_S$ derived from the sampling clock generator 40. Then, the luminance data $Y_{D1}$ and color difference data $C_{D1}$ are input into the first digital signal processing circuit 41, and are thereafter stored into the image memory 24a of the memory card 24 under the control of the memory-card-data transfer control section 42. The memory-card-data transfer control section 42 receives the transfer clock $\phi_1$ from the memory-card-data transfer clock generator 44 via the AND gate 45 and OR gate 46, and controls the first digital signal processing circuit 41 and image memory 24a in response to the transfer clock $\phi_1$.

RECORDING FORMAT OF IMAGE MEMORY

Figures 5, 6:
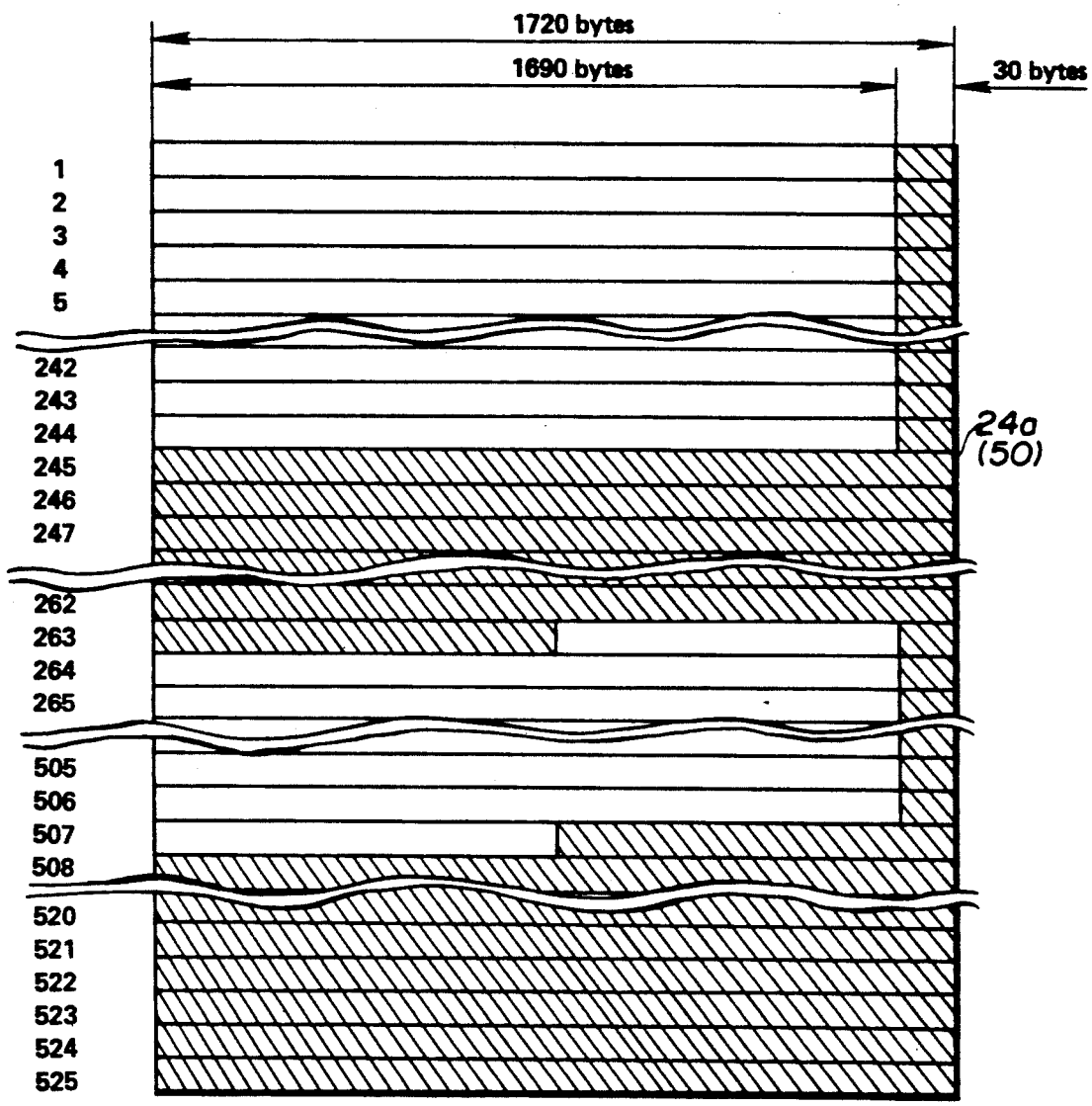
FIGS. 5 and 6 illustrate recording formats of an image memory employed in a memory card shown in FIG. 3.

The image data processed in the electronic still camera system are recorded on the image memory 24a in the recording formats as illustrated in FIGS. 5 and 6.

In the image memory 24a, as shown in FIG. 5, a 525-line address space is formed in the image data recording area of 1 frame in accordance with the scanning line number of the NTSC color television system. Therefore, the image data consisting of 1720 bytes can be recorded on each memory line. Under the control of the memory-card-data transfer control section 42, the odd field image data is recorded on the memory area from a 1st line to 860 bytes of a 263rd line, whereas the even field image data is recorded on the memory area from 861 bytes of the 263rd line to the end of the 525th line. Similarly, the image data corresponding to the horizontal scanning is stored in each line memory area from a first byte to a 1690th-byte, and the image data of "0" corresponding to the horizontal retrace time, or flyback time, is recorded on the remaining 30 bytes of each recording line within the memory area defined by the 1st line to the 244th line, and the 861 bytes of the 263rd line to the 860 bytes of the 507th line, under the control of the memory-card-data transfer control section 42. In addition, the image data of "0" corresponding to the vertical retrace time, or flyback time, is recorded on the memory area defined by the 245th line to the 860 bytes of the 263rd line, and the 861 bytes of the 243rd line to the 525th line.

When the parity data is added to the digital image data in the first digital signal processing circuit 41, this parity data is stored in the "0" data recording area of the above-described image memory 24a.

The memory-card-data transfer control section 42 controls the first digital signal processing circuit 41 in such a manner that the recording formats for the respective lines of the image memory 24a become a recording format as shown in FIG. 6.

That is, under the control of the memory-card-data transfer control section 42, the luminance data Yn which has been sampled every pixel and A/D-converted, and the color difference data $(R-Y)n$ and $(B-Y)n$ which have been alternately selected to be A/D-converted, are sequentially recorded in the order of the color difference data and luminance data.

When the transfer operation of the 1-frame image data to the memory card 24 is completed under the control of the memory-card-data transfer control section 42, a transfer completion signal is output from the memory-card-data control section 42 to the control section 33. Under this condition, the control section 33 stops outputting of the recording command signal "D" and is brought into the waiting condition for the operation of the release switch 13.

IMAGE DATA REPRODUCTION

Reproducing the image data stored in the memory card 24 will now be described with reference to FIG. 3.

First, a user sets the operation mode selecting switch to the reproducing mode. In the reproducing mode, the control section 33 shown in FIG. 3 outputs the reproducing command signal "F". This reproducing command signal "F" sets the flip-flop 58 via OR gate 57. In response to the set output from the flip-flop 58, the control clock $\phi_2$ is applied via the AND gate 48, OR gates 46 and 63 to the memory-card-data transfer control section 42 and frame-memory-data transfer control section 51.

In response to the reproducing command signal "F", the image data is read out from the image memory 24a under the control of the memory-card-data transfer control section 42, and the image data transferred from the image memory 24a is written into the frame memory 50 under the control of the frame-memory-transfer control section 51.

It should be understood that the above-described frame memory 50 has a memory capacity capable of recording 1-frame image data, and also the same address space as that of the image memory 24a.

When the image data transfer operation from the image memory 24a to the frame memory 50 is completed, i.e., the final address of the frame memory 50 is designated in the frame-memory-data transfer control section 51, the final address signal is output from the frame-memory-data transfer control section 51, which resets flip-flop 58. Thereafter, the set output signal "Q" of the flip-flop 58 becomes "0" and no control clock $\phi_2$ is supplied to the frame-memory data transfer control section 51 and memory-card-data-transfer control section 42. The frame memory-data transfer control section 51 will commence the reading control of the image data to the frame memory 50.

Since the flip-flop 58 is reset, a "1" signal derived from the inverter 62 is supplied to AND gate 59, the reproducing command signal "F" is supplied to the AND gate 59 via OR gate 57, and the control clock $\phi_3$ is applied via the AND gate 64 to the transfer clock generator 65 and video sync signal generator 56. Thereafter, the transfer clock generator 65 sends the transfer clock $\phi_5$ via the AND gate 61 and OR gate 63 to the frame-memory-data transfer control section 51. Upon receipt of the transfer clock $\phi_5$, the frame-memory-data transfer control section 50 commences to control the image data transfer from the frame memory 51 to the second digital signal processing circuit 52.

The video sync signal generator 56 outputs the horizontal sync signal $H_{sync}$ and vertical sync signal $V_{sync}$ to the color encoder 55.

In the second digital signal processing circuit 52 the digital data transferred from the frame memory 50 is separated into the luminance data $Y_{D2}$ and color difference data $C_{D2}$ which are then transferred to the corresponding D/A converters 53 and 54. The luminance signal $Y_{A1}$ and color difference signal $C_{A2}$ derived from the respective D/A converters 53 and 54 are input into the color encoder 55. These signals are encoded into the desired NTSC color television signal in the color encoder 55, and the NTSC color television signal is supplied to both the liquid crystal television unit 23 and to the analog signal output terminal 19b.

In this case, when the output mode selecting switch 17 is set to the A-OUT (Analog-Output) mode, and an external monitor (not shown) is connected to the analog image signal output terminal 19b, the reproduced image data can be displayed on the external monitor.

IMAGE DATA TRANSFERRED TO VIDEO TAPE RECORDER

Referring back to FIGS. 3 and 4, a description will be given of transferring image data to the video tape recorder, which image data has been stored in the memory card 24.

First, a user confirms that the video tape recorder 25 is set to the digital recording mode, and then the output mode selecting switch 17 is set to the D-OUT (Digital Output) mode. Under this condition, the control section 33 of the camera apparatus 10 selects the digital image signal output terminal 19a. The user connects the digital-image-signal output terminal 19a of the camera apparatus 10 to the digital-image-signal input terminal 80a of the video tape recorder 25; the sync signal output terminal 19c to the sync signal input terminal 80c; and the video control signal output terminal 19d to the remote control signal input terminal 80d. Then, the user sets the video tape recorder 25 to the digital recording mode. Under these circumstances, the control section 107 of the video tape recorder 25 selects the gate circuit 89 by signal "H".

Figure 7:
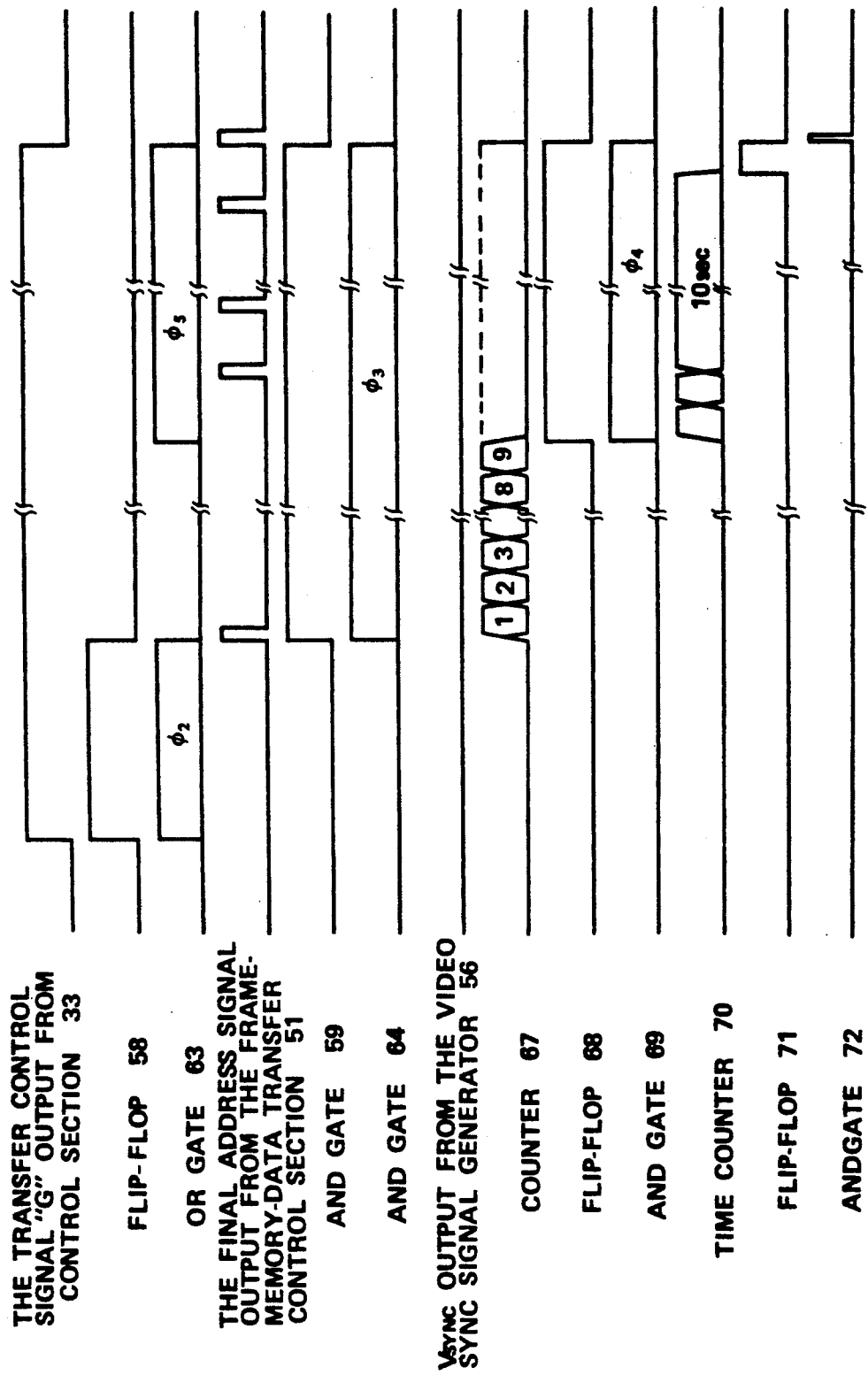
FIG. 7 is a time chart for illustrating output signal conditions of major circuit portions in the circuit arrangement shown in FIG. 3 while a signal transfer operation is performed.

When the user sets the operation mode selecting switch 16 to the transfer mode and actuates the release switch 13, the transfer control signal "G" is output from the control section 33 (see FIG. 7). Since the transfer command signal "G" is output, the flip-flop 58 is set and thus, the image data is transferred from the image memory 24a to the frame memory 50 in a similar manner to the data reproduction made. When the data transfer operation to the frame memory 50 is completed, the final address signal is output from the frame-memory-data control section 51, which causes the flip-flop 58 to be reset. Since the flip-flop 58 is reset, the frame-memory-data-control section 51 starts to control the image data reading operation of the frame memory 50, and the control clock $\phi_3$ is applied to the transfer clock generator 65 and video sync signal generator 56.

However, under the above-described condition, since no transfer clock $\phi_5$ is supplied from the transfer clock generator 65 to the frame-memory-data transfer control section 51, the frame- memory-data control section 51 does not commence the data reading control of the frame memory 50.

When, on the other hand, a "1" signal is output from the AND gate 59 by resetting the flip-flop 58, it is supplied to the remote-control-signal input terminal 80d of the video tape recorder 25 (FIG. 4) via the recorder-control-signal output terminal 19d, (FIG. 3). Thus, the video tape recorder 25 is brought into the digital image recording condition in response to the signal supplied from the remote-control-signal input terminal 80d, and the control section 107 outputs the motor drive command "K" to the motor drive control section 110.

The video sync signal generator 56 in the camera apparatus 10 supplies the vertical sync signal $V_{sync}$ to the counter 67 via the AND gate 66, to which the transfer command signal "G" has been applied, and also sends the vertical sync signal $V_{sync}$ to the sync signal input terminal 80c of the video tape recorder 25 via the sync signal output terminal 19c.

In the video tape recorder 25, the vertical sync signal $V_{sync}$ input from the sync signal input terminal 80c is supplied to the motor drive control section 110. The motor drive control section 110 performs the synchronization among the vertical sync signal $V_{sync}$, the rotation number of the rotary cylinder 96, and the positions of the magnetic recording heads 93 to 95.

In the camera apparatus 10, the vertical sync signal $V_{sync}$ is counted by the counter 67 (FIG. 3). When the count value of the counter 67 reaches 10, the carry output "C" derived from the counter 67 sets the flip-flop 68 (see FIG. 7). Since the flip-flop 68 is set, the set output from terminal Q of the flip-flop 68 is supplied via the OR gate 60 to the AND gate 61, and the transfer clock $\phi_5$ is supplied to the frame-memory-data transfer control section 51 via OR gate 63. Under these conditions, the frame-memory-data transfer control section 51 transfers the image data stored in the frame memory 50 to the digital image signal output terminal 19a.

As previously described, in the camera apparatus 10 according to the preferred embodiment, no data transfer operation is performed until 10 vertical sync pulses $V_{sync}$ are output to the video tape recorder 25 after the video tape recorder 25 is set to the recording condition, so that the video tape recorder 25 can record the image data transferred thereto under perfect synchronization with the vertical sync signal $V_{sync}$.

The image data transferred from the digital-image signal output terminal 19a is supplied via the digital image signal input terminal 80a and gate circuit 89 to the first recording signal converting circuit 88.

In the first recording signal converting circuit 88, the above-described transferred data are converted into a predetermined format, and the resultant data are supplied to the corresponding magnetic recording heads 93 to 95 so as to record the image data on the magnetic tape 26a.

RECORDING FORMATS OF MAGNETIC TAPE

Referring now to FIGS. 8 to 10, the recording formats of the magnetic tape 26a will be described.

The magnetic recording heads 93 to 95 are helical-scanned over the magnetic tape 26a, and 1-frame image data is recorded on the magnetic tape 26a during one scanning operation with three tracks. No signal recorded portion is formed on the image-data recorded portion corresponding to the vertical retrace, or flyback time within 1 field. As illustrated in FIG. 9, no signal recorded portion is made on the image-data recorded portion corresponding to the horizontal retrace, or flyback time within 1 horizontal scanning. The data recording formats for the respective pixels are as follows. The luminance data Yn, and the color difference data (R−Y)n, (B−Y)n which are alternately supplied every pixel, are successively recorded in the order of the color difference data and luminance data. If a parity code is added to the above data, it is recorded on the no signal recorded portion.

While the digital image data are processed in the video tape recorder 25, the control clock $\phi_4$ is supplied via the AND gate 69 to the time counter 70 and the time counter 70 and the time counter 70 counts the time lapse in the camera apparatus 10. When the time counter 70 has counted 10 seconds, the carry output "C" thereof sets the flip-flop 71. In the frame-memory-data transfer control section 51, when the final address signal is output, the frame-memory-data transfer completion signal is output from the AND gate 72, so that the image data transfer operation is completed.

Similarly, in the video tape recorder 25, the video control signal output from the AND gate 59 of the camera apparatus 10 becomes "O", indicating that the recording operation by the video tape recorder 25 is completed.

As previously described above, in the electronic still camera system according to the preferred embodiment of the invention, the still image data can be stored in the memory card 24 and, furthermore, the image data stored in the memory card 24 can be transferred to the video tape recorder 25. As a result, a compact electronic still camera apparatus 10 can be realized, and the still images can be readily edited on the video tape recorder 25. Since the data transfer from the camera apparatus 10 to the video tape recorder 25 is performed within a predetermined time period, the image data can be displayed on the TV monitor when the image is reproduced by the video tape recorder 25.

It should be noted that when it is desired to transfer the analog image signal from the camera apparatus 10 to an analog video tape recorder (not shown), the user simply sets the output mode selecting switch 17 to the A-OUT mode, so that the NTSC color television signal can be obtained from the analog image data output terminal 19b, which is similar to the reproduction operation.

SECOND EMBODIMENT OF ELECTRONIC STILL CAMERA APPARATUS

Figure 11:
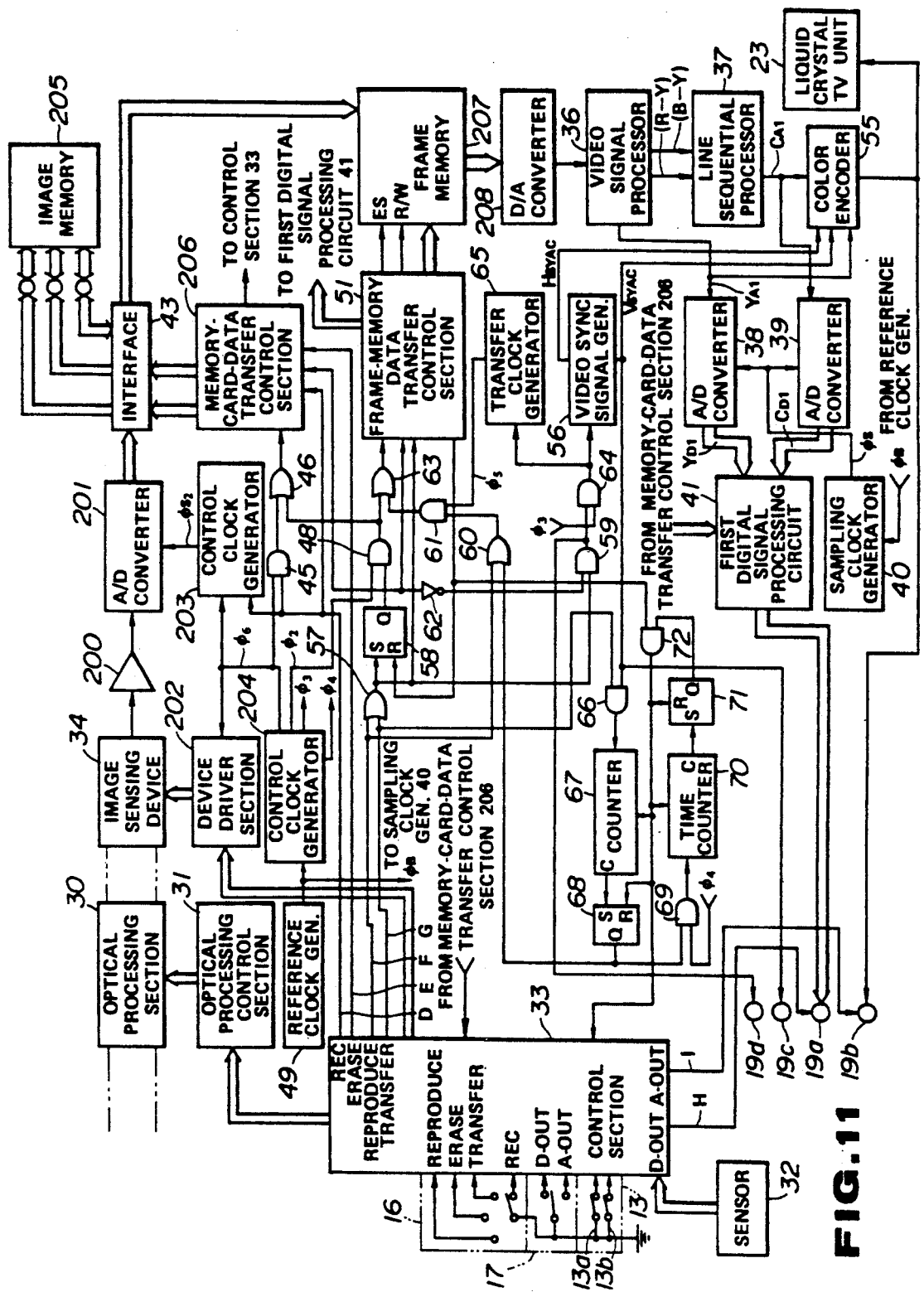
FIG. 11 is a schematic block diagram of another circuit arrangement for the camera apparatus shown in FIG. 2 according to a second embodiment of the invention.

Referring now to FIG. 11, another embodiment of an electronic still camera apparatus according to the present invention will be described.

The circuit arrangement shown in FIG. 11 corresponds to the circuit arrangements shown in FIGS. 1 and 2, and is similar to the circuit arrangement illustrated in FIG. 3.

For the sake of simplicity, the same reference numerals shown in FIG. 3 will be employed for denoting the same circuit elements shown in FIG. 11.

In FIG. 11, an output signal derived from the image sensing device 34 is supplied to an A/D converter 201 via an amplifier 200. The device drive section 202 for driving the image sensing device 34 is substantially synchronized with the sampling or control clock generator 203 for producing the sampling clock pulse $\phi_{S2}$ which is applied to the A/D converter 201 in response to a control clock $\phi_6$ output from a control clock generator 204. The A/D converter 201 converts the analog signal, which is output from the image sensing device 34 every one pixel, into 8-bit digital data.

The output from the A/D converter 201 is supplied via a memory card interface 43 to an image memory 205 contained in the memory card 24. The image memory 205 is employed so as to sequentially store the digital data corresponding to each pixel of the image sensing device 34. If the image sensing device 34 stores 380,000 pixels, for example, the required memory area for 1-frame image data is on the order of 3 M bits (mega bits).

When digital data reduction is performed for the digital data output from the A/D converter 201, the memory capacity of the image memory 205 for -1-frame data is less than 3 M bits.

The digital data read/write operation to the image memory 205 is controlled under the memory-card-data transfer control section 206. The memory-card-data transfer control section 206 is operated in synchronism with the clocks $\phi_2$, $\phi_6$ applied via the OR gate 46 thereto. While writing the digital data into the image memory 205, the memory-card-data control section 206 is operated in synchronism with the clock $\phi_6$ which is applied from the control clock generator 204 via the AND gate 45 and OR gate 46 thereto.

The image data output from the image memory 205 via the memory card interface 43 is supplied to the frame memory 207. The frame memory 207 has the same address space as that of the image memory area for 1 frame of the image memory 205.

The image data output from the frame memory 207 is supplied to a D/A converter 208. An analog image signal output from the D/A converter 208 is separated into the luminance signal $Y_{Aa}$ and color difference signals (R−Y), (B−Y) in the color separating circuit (video signal processor) 36. The color separating signals (R−Y), (B−Y) are supplied to the line sequential circuit 37 so as to be line sequential-processed. The resultant color difference signal $C_{A1}$ is supplied to the A/D converter 39 and to color encoder 55. The color encoder 55 produces the NTSC color television signal based upon the color difference signal $C_{A1}$, luminance signal $Y_{a1}$, horizontal sync signal $H_{sync}$ and vertical sync signal $V_{sync}$. This NTSC color television signal is supplied to the liquid crystal television unit 23 and to the analog image-signal output terminal 19b.

Both the luminance signal $Y_{A1}$ and color difference signal $C_{A1}$ are supplied to the corresponding A/D converters 38 and 39, where they are converted into two sets of 8-bit digital data $Y_{D1}$ and $C_{D1}$. Both the 8-bit digital data $Y_{D1}$, $D_{D1}$ are supplied via the first digital data processing circuit 41 to the digital-image signal output terminal 19a.

RECORDING OPERATION OF SECOND EMBODIMENT

In the recording mode, when the release switch 13 is depressed over its full travel path, the control section 33 outputs operation command signals to the optical process control section 31, device driver section 202, sampling clock 206.

Under the control of the optical processing control section 31, the shutter provided within the optical process section 30 is opened and the object's image is focused onto the innate sensing device 34.

The image sensing device 34 sequentially outputs the electron charges stored therein every one pixel to the A/D converter 201 under the control of the device drive section 202. The A/D converter 201 converts the charge signals derived from the image sensing device 31 into the 8-bit digital data, and supplies the 8-bit digital data via the interface 43 to the image memory 205. The memory-card-data transfer control section 206 sequentially designates the addresses of the image memory 205, and the digital data output from the A/D converter 201 is stored in the image memory 205. When the data corresponding to 1-frame image data is stored in the image memory 205, the transfer completion signal is output to the control section 33 from the memory-card-data transfer control section 206, which completes the recording process of the digital image data.

REPRODUCING AND TRANSFER MODES

The reproduction mode and the data transfer mode to the video tape recorder, for the embodiment of FIG. 11, will now be described.

It should be understood that although both the reproduction mode and transfer mode are basically the same as those of the first preferred embodiment, a difference exists in the digital image signal production whereby the NTSC color television signal is obtained from the digital data previously stored in the frame memory 207. That is, since the digital data transferred from the image memory 205 to the frame memory 207 correspond to the digital data which are obtained in accordance with each 1 pixel of the image sensing device 34, the digital data are converted by the D/A converter 208 into the corresponding analog signals. The, said analog signals are supplied to the video signal processor (color separating circuit) 36 where they are separated into the luminance signal $Y_{A1}$ and color difference signals $(R-Y)$, $(B-Y)$. The color difference signals $(R-Y)$, $(B-Y)$ are transferred to the line sequential processor 37. The line-sequential-processed color difference signal $C_{A1}$ is supplied to the A/D converter 39 and to the color encoder 55. In the color encoder 55, the NTSC color television signal is produced based upon the color difference signal $C_{A1}$, luminance signal $Y_{A1}$, horizontal sync signal $H_{sync}$ and vertical sync signal $V_{sync}$ which are input together with the color difference signal $C_{A1}$. The resultant NTSC color television signal is output into the liquid crystal television unit 23 and the analog image signal output terminal 19b.

Bot the luminance signal $Y_{A1}$ and color difference signal $C_{A1}$ are supplied to the corresponding A/D converters 38, 39 where they are converted into the 8-bit digital data based upon the sampling clock $\phi_S$ (for instance, 13.5 MHz) output from the sampling clock generator 40. The resultant digital data are processed in the first digital processing circuit 41. The processed digital data are sequentially output to the digital-image-signal output terminal 19a.

As previously described in detail, according to the second preferred embodiment, the following various operations are the same as those of the first preferred embodiment. That is, the digital image data are transferred from the image memory 205 to the frame memory 207 and from the frame memory 207 either to the liquid crystal television unit 23, or to the video tape recorder 25, which are under control of the memory-card-data transfer control section 206 and of the frame-memory-data transfer control section 51. Also, the controlling operation from the camera apparatus 10 to the video tape recorder 25 is the same as that of the first preferred embodiment during the transfer mode.

In the first and second preferred embodiments, NTSC color television signals are produced. However, the present invention is not limited to NTSC color television signals. Other types of color television signals may be produced, for example, in accordance with the PAL (Phase Alternation Line) system or the SECAM (Sequential Colours A Memoire) system.

Although the time counter 70 in the first and second preferred embodiments performs a 10-second counting operation, the counting time thereof may be freely chosen by a user.

What is claimed is:

1. A video data recording system, comprising:
   housing means;
   optical means arranged at least partly in said housing means for forming an optical image on a predetermined plane in said housing means;
   image data processing means arranged in said housing means for receiving said optical image as a still image and for producing electronic image data representative of said still image;
   buffer memory means coupled to said image data processing means for storing the electronic image data derived from said image data processing means;
   detachable memory means detachably mounted to said housing means and electrically coupled to said buffer memory means when mounted to said housing means, for storing a limited number of independent electronic image data which are supplied from said buffer memory means;
   output terminal means arranged on said housing means and coupled for outputting said electronic image data derived from said detachable memory means via said buffer memory means when said detachable memory means is mounted to said housing means;
   write control means arranged in said housing means for controlling a writing operation of said electronic image data supplied from said buffer memory means into said detachable memory means when said detachable memory means is mounted to said housing means;
   read-out control means arranged in said housing means for controlling a reading out operation of said electronic image data to said output terminal means via said buffer memory means when said detachable memory means is mounted to said housing means; said read-out control means including:
      transfer means for repeatedly transferring to said output terminal means, said electronic image data representative of one of the still images stored in said detachable memory means via said buffer memory means, such that said electronic image data representative of said one still image is repeatedly transferred to said output terminal means a plurality of times over a given time period;
      transfer time sensing means for sensing whether or not said given time period during which said electronic image data of said one still image is repeatedly transferred by said transfer means, corresponds to a predetermined time period; and
      transfer control means for stopping the electronic image data transfer of said electronic image data of said one still image by said transfer means responsive to said given time period during which said transfer means repeatedly transfers said electronic image data of a same still image exceeding said predetermined time period; and
   peripheral memory means outside of said housing means and detachably coupled to said output terminal means and capable of storing a large number of independent image data, for storing said repeatedly transferred electronic image data, corresponding to a plurality of a same still image, output from said output terminal means, said large number being substantially greater than said limited number;
   said peripheral memory means including reproducing means for continuously and sequentially reproducing said same electronic image data of said same still image stored in said peripheral memory means, whereby each said same still image stored in said peripheral memory means is sequentially reproduced for such predetermined time period.

2. A video data recording system as claimed in claim 1, wherein said image data processing means further includes:
  image sensing means for producing electronic signals in response to said optical image;
  video signal producing means for producing a video signal based on said electronic signals produced by said image sensing means; and
  analog-to-digital converting means for converting said video signal produced by said video signal producing means into digital electronic image data which corresponds to said received optical image.

3. A video data recording system as claimed in claim 2, wherein said detachable memory means comprises a memory card containing at least one semiconductor memory chip.

4. A video data recording system as claimed in claim 1, wherein said detachable memory means comprises a detachable semiconductor memory means.

5. A video data recording system as claimed in claim 1, wherein said image data processing means includes:
  image sensing means for producing electronic signals in response to said optical image; and
  analog-to-digital converting means for converting said electronic signals produced by said image sensing means into digital electronic image data which corresponds to said received optical image.

6. A video data recording system as claimed in claim 5, wherein said detachable memory means comprises a memory card containing at least one semiconductor memory chip.

7. A video data recording system as claimed in claim 5, wherein said detachable memory means comprises a detachable semiconductor memory means.

8. A video data recording system as claimed in claim 5, further comprising:
  video signal producing means coupled to said detachable memory means when said detachable memory means is mounted to said housing means, and also coupled to said output terminal means, for producing a video signal based on said digital electronic image data output from said detachable memory means and for outputting said video signal to said output terminal means.

9. A video data recording system as claimed in claim 5, wherein:
  said detachable memory means stores said digital electronic image data output from said analog-to-digital converting means; and
  said video data recording system further comprises:
  digital-to-analog converting means, coupled to said detachable memory means, for converting said digital electronic image data read out from said detachable memory means into a corresponding analog electronic image signal; and
  output control means, for supplying to said output terminal means, one of said digital electronic image data output from said detachable memory means and said analog electronic image signal produced by said digital-to-analog converting means.

10. A video data recording system as claimed in claim 1, wherein said transfer means comprises:
  one-frame memory means for storing said electronic image data representative of one still image previously recorded on said detachable memory means; and
  address designating means for repeatedly and sequentially designating an address of said one-frame memory means.

11. A video data recording system as claimed in claim 1, further comprising:
  synchronizing signal generating means, arranged in said housing means, for generating a synchronizing signal; and
  synchronizing signal output means for outputting a predetermined number of said synchronizing signals generated by said synchronizing signal generating means to said output terminal means.

12. A video data recording system as claimed in claim 11, wherein said synchronizing signal is a vertical synchronizing signal of a video signal.

13. A video data recording system as claimed in claim 12, wherein said means for controlling said reading out operation includes means for commencing the read out operation of said electronic image data from said detachable memory means after a predetermined number of said synchronizing signals are output from said output terminal means.

14. A video data recording system as claimed in claim 1, wherein said peripheral memory means comprises a magnetic tape recorder means.

15. A video data recording system as claimed in claim 14, wherein said magnetic tape recorder means comprises a digital video tape recorder means.

16. A video data recording system as claimed in claim 1, wherein said display means comprises a liquid crystal television means, mounted on said housing means, for displaying an image in response to said electronic image data output from said detachable memory means.

17. A video data recording system as claimed in claim 1, wherein said detachable memory means comprises a detachable semiconductor memory card.

18. A video data recording system as claimed in claim 1, wherein said memory card is maintained in a fixed stationary position in said housing means.

19. A camera apparatus capable of coupling to a peripheral memory means for storing a large number of independent image data supplied from an output terminal means of the camera apparatus, comprising:
  housing means;
  optical means arranged at least partly in said housing means for forming an optical image on a predetermined plane in said housing means;
  image data processing means arranged in said housing means for receiving said optical image as a still image and for producing electronic image data representative of said still image;
  buffer memory means coupled to said image data processing means for storing the electronic image data derived from said image data processing means;
  detachable memory means detachably mounted to said housing means and electrically coupled to said buffer memory means when mounted to said housing means, for storing a limited number of independent electronic image data which are supplied from said frame memory means, said limited number being substantially smaller than said large number;
  output terminal means arranged on said housing means and coupled for outputting said electronic image data derived from said detachable memory means via said buffer memory means when said detachable memory means is mounted to said housing means;

write control means arranged in housing means for controlling a writing operation of said electronic image data supplied from said buffer memory means into said detachable memory means when said detachable memory means is mounted to said housing means; and read-out control means arranged in housing means for controlling a reading out operation of said electronic image data to said output terminal means via said buffer memory means when said detachable memory means is mounted to said housing means; said read-out control means including:

transfer means for repeatedly transferring to said output terminal means, said electronic image data representative of one of the still images stored in said detachable memory means via said buffer memory means, such that said electronic image data representative of said one still image is repeatedly transferred to said output terminal means a plurality of times over a given time period;

transfer time sensing means for sensing whether or not said given time period during which said electronic image data of said one still image is repeatedly transferred by said transfer means, corresponds to a predetermined time period; and transfer control means for stopping the electronic image data transfer of said electronic image data of said one still image by said transfer means responsive to said given time period during which said transfer means repeatedly transfers said electronic image data of a same still image exceeding said predetermined time period.

20. A camera apparatus as claimed in claim 19, wherein said image data processing means includes:

image sensing means arranged on said predetermined plane in said housing means, for producing electronic signals in response to said optical image;

video signal producing means for producing a video signal based on said electronic signals produced by said image sensing means; and an along-to-digital converting means for converting said video signal produced by said video signal producing means into digital electronic image data which corresponds to said optical image.

21. A camera apparatus as claimed in claim 20, wherein said detachable memory means comprises a memory card containing at least one semiconductor memory chip.

22. A camera apparatus as claimed in claim 19, wherein said detachable memory means comprises a detachable semiconductor memory means.

23. A camera apparatus as claimed in claim 19, wherein said image data processing means includes:

image sensing means arranged on said predetermined plane in said housing means for producing electronic signals in response to said optical image; and analog-to-digital converting means for converting said electronic signals produced by said image sensing means into digital electronic image data which corresponds to said optical image.

24. A camera apparatus as claimed in claim 23, wherein said detachable memory means comprises a memory card containing at least one semiconductor memory chip.

25. A camera apparatus as claimed in claim 23, further comprising:

video signal producing means coupled to said detachable memory means when said detachable memory means is mounted to said housing means, and also coupled to said output terminal means, for producing a video signal based on said digital electronic image data output from said detachable memory jeans and for outputting said video signal to said output terminal means.

26. A camera apparatus as claimed in claim 23, wherein said detachable memory means stores said digital electronic image data output from said analog-to-digital converting means; and said camera apparatus further comprises:

digital-to-analog converting means coupled to said detachable memory means for converting said digital electronic image data read out from said detachable memory means into a corresponding analog electronic image signal; and analog output terminal means coupled to said digital-to-analog converting means for outputting said analog electronic image signal produced by said digital-to-analog converting means.

27. A video data recording system as claimed in claim 19, wherein said detachable memory means comprises a detachable semiconductor memory card.

28. A video data recording system as claimed in claim 27, wherein said memory card is maintained in a fixed stationary position in said housing means.

29. A method of recording and storing image data in a video data recording system, wherein the video data recording system comprises housing means; optical means at least partly in said housing means for forming an optical image on a predetermined plane in said housing means; image data processing means arranged in said housing means for receiving said optical image as a still image and for producing electronic image data representative of said still image; buffer memory means for storing the electronic image data derived from said image data processing means and output terminal means for outputting said electronic image data;

the method comprising:

detachable mounting a detachable memory means capable of storing a limited number of independent electronic image data to said housing means and electrically coupling said detachable memory means to said buffer memory means when said detachable memory means is mounted to said housing image data via said buffer memory means;

controlling a writing operation of said electronic image data supplied from said buffer memory means into said detachable memory means when said detachable memory means is mounted to said housing means;

repeatedly transferring to said output terminal means, said electronic image data representative of one of the still images stored in said detachable memory means, such that said electronic image data representative of said one still image is repeatedly transferred to said output terminal means a plurality of times over a given time period;

sensing whether or not said given time period during which said electronic image data of said one still image is repeatedly transferred, corresponds to a predetermined time period;

stopping the image data transfer of said electronic image data of said one still image responsive to said given time period during which said electronic image data is repeatedly transferred exceeding said predetermined time period;

detachably coupling a peripherally memory means capable of storing a large number of independent image data, located outside of said housing means, to said output terminal means for storing said repeatedly transferred electronic image data, corresponding to a plurality of a same still image, output from said output terminal means, said large number being substantially greater than said limited number; and continuously and sequentially reproducing said same electronic image data of said same still image stored in said peripheral memory means, whereby each said same still image stored in said peripheral memory means is sequentially reproduced for said predetermined time period.

30. The method of claim 29; wherein said image data processing means further includes image sensing means for producing electronic signals in response to said optical image;

the method further comprising;

producing a video signal based on said electronic signals produced by said image sensing means; and analog-to-digital converting said produced video signals into digital electronic image data which corresponds to said received optical image.

31. The method of claim 29, wherein said image data processing means includes image sensing means for producing electronic signals in response to said optical image;

the method further comprising:

analog-to-digital converting said electronic signals produced by said image sensing means into digital electronic image data which corresponds to said received optical image.

32. The method of claim 29, wherein said image data processing means produces digital electronic image data in response to said optical image, said digital electronic image data being stored in said detachable memory means.

33. The method of claim 32, further comprising:

digital-to-analog converting said digital electronic image data read out from said detachable memory means into a corresponding analog electronic image signal; and supplying to said output terminal means, one of said digital electronic image data output from said detachable memory means and said corresponding analog electronic image signal.

34. The method of claim 29, wherein said electronic image data is digital electronic image data.

35. The method of claim 34, wherein said step of repeatedly transferring comprises:

storing, in a one-frame memory means, said digital electronic image data representative of one still image previously stored in said detachable memory means; and repeatedly and sequentially designating an address of said one-frame memory means.

36. The method of claim 29, further comprising:

generating synchronizing signals in said housing means; and outputting a predetermined number of said synchronizing signals to said output terminal means.

37. The method of claim 36, wherein said synchronizing signals are vertical synchronizing signals of a video signal.

38. A video data recording system, comprising:

housing means;

optical means arranged at least partly in said housing means for forming an optical image on a predetermined plane in said housing means;

image data processing means arranged in said housing means for receiving said optical image as still image and for producing electronic image data representative of said still image;

buffer memory means coupled to said image data processing means for storing the electronic image data derived from said image data processing means;

detachable memory means mounted to said housing means and electrically coupled to said buffer memory means when mounted to said housing means, for storing a limited number of independent electronic image data which are supplied from said buffer memory means;

output terminal means arranged on said housing means and coupled for outputting said electronic image data derived from said detachable memory means when said detachable memory means is mounted to said housing means;

control means arranged in said housing means for controlling a writing operation and reading operation of said electronic image data to and from said detachable memory means; and video data storage means provided outside of said housing means and coupled to said output terminal means, for storing a large number of independent image data representative of still images;

said control means including transferring means for repeatedly transferring to said output terminal means for a predetermined time period, said electronic image data representative of one of the still images stored in said detachable memory means; and said video data storage means including means for storing said repeatedly transferred electronic image data, corresponding to a plurality of same still image from said output terminal means and means for continuously and sequentially reproducing said same electronic image data of said same still image stored in said video storage means, whereby each said same still image stored in said video storage means is sequentially reproduced for the predetermined time period.

39. The video data recording system according to claim 38, wherein said detachable memory means comprises a detachable semiconductor memory means.

40. The video data recording system according to claim 38, wherein said video data storage means comprises a magnetic tape recorder.

41. A video data recording system, comprising:

still image data storing means for storing a limited number of electronic image data each representing an independent still image;

video data storage means for storing a large number of electronic image data each representing an independent still image; and control means coupled to said still image data storing means and to said video data storage means for repeatedly transferring one of said limited number of electronic image data stored in said still image data storing means to said video data storage means for a predetermined time period, and for causing said video data storage means to store said repeatedly transferred electronic image data, such that said repeatedly transferred electronic image data stored in said video data storage means will be used for reproducing as a still image for the predetermined time period;

said still image data storing means comprising a still camera apparatus, said still camera apparatus including:

optical means for forming an optical image on a predetermined plane in a showing of said camera apparatus;

image data processing means for receiving said optical image as a still image and for producing electronic image data representative of said still image;

buffer means coupled to said image data processing means for storing the electronic image data derived from said image data processing means;

detachable memory means mounted to said housing and electrically coupled to said buffer means when mounted to said housing, for storing a limited number of independent electronic image data which are supplied from said buffer means;

output terminal means arranged on said housing and coupled to an interface for outputting said electronic image data derived from said detachable memory means via said interface when said detachable memory means is mounted to said housing; and said control means including a control device arranged in said housing for controlling a writing operation and a reading operation of said electronic image data to and from said detachable memory means and said control device including means for repeatedly transferring to said output terminal means for a predetermined time period, said electronic image data representative of one of the still images stored in said detachable memory means.

42. The video data recording system according to claim 41, wherein said still image data storing means includes detachable memory means for storing a limited number of the electronic image data and capable of being mounted to a housing of the video data recording system so as to electrically coupled to said control means and to said video data storage means.

43. The video data recording system according to claim 42, wherein said detachable memory means includes a detachable semiconductor memory means.

44. The video data recording system according to claim 41, wherein said video data storage means comprises a magnetic tape recorder.

45. The video data recording system according to claim 41, wherein said detachable memory means includes a detachable semiconductor memory means.

46. The video data recording system according to claim 41, wherein said video data storage means includes means for storing said repeatedly transferred electronic image data, corresponding to a plurality of same still image from said output terminal means and means for continuously and sequentially reproducing said same electronic image data of said same still image stored in said video storage means is sequentially reproduced for the predetermined time period.

47. The video data recording system according to claim 46, wherein said video data storage means comprises a magnetic tape recorder.

* * * * *